United States Patent [19]

Edwards

[11] Patent Number: 5,243,684

[45] Date of Patent: Sep. 7, 1993

[54] PORTABLE ELECTRICALLY HEATED CONTAINER FOR LIQUIDS

[76] Inventor: F. Dwayne Edwards, 6583 Vinson Rd., Macon, Ga. 31206

[21] Appl. No.: 762,476

[22] Filed: Sep. 19, 1991

[51] Int. Cl.⁵ .................. H05B 1/00; A47J 27/00; A47J 36/24
[52] U.S. Cl. .................. 392/444; 219/436; 219/438
[58] Field of Search .................. 219/432–442, 219/504, 505, 536, 542; 392/444

[56] References Cited

U.S. PATENT DOCUMENTS

| | | | |
|---|---|---|---|
| 1,028,383 | 6/1912 | Parkhurst | 219/436 X |
| 1,792,390 | 2/1931 | Okamoto | 219/436 X |
| 1,916,804 | 7/1933 | McNab . | |
| 1,944,495 | 1/1934 | Collins . | |
| 2,725,460 | 11/1955 | Braski et al. | 219/436 |
| 2,826,670 | 3/1958 | Keefe | 219/438 X |
| 2,863,037 | 12/1958 | Johnstone . | |
| 2,901,587 | 8/1959 | Burreson | 219/441 |
| 3,010,006 | 11/1961 | Schwameke | 219/438 X |
| 3,022,411 | 2/1962 | Super et al. | 219/441 |
| 3,059,092 | 10/1962 | Olson | 219/441 |
| 3,089,943 | 5/1963 | Serio | 219/435 X |
| 3,189,728 | 6/1965 | Schneider . | |
| 3,813,517 | 5/1974 | McGruder . | |
| 3,890,484 | 6/1975 | Kamins et al. . | |
| 3,931,494 | 1/1976 | Fisher | 219/441 |
| 4,095,090 | 6/1978 | Pianezza . | |
| 4,305,533 | 12/1981 | Wightman et al. . | |
| 4,439,668 | 3/1984 | Wells . | |
| 4,523,083 | 6/1985 | Hamilton . | |
| 4,801,782 | 1/1989 | Ineson . | |

FOREIGN PATENT DOCUMENTS

| | | | |
|---|---|---|---|
| 277625 | 9/1914 | Fed. Rep. of Germany | 219/438 |
| 694282 | 9/1930 | France | 219/436 |
| 215539 | 5/1924 | United Kingdom | 219/438 |

Primary Examiner—Anthony Bartis
Attorney, Agent, or Firm—James A. Hinkle

[57] ABSTRACT

A portable container for maintaining a liquid in a heated state by means of electrical energy supplied to a heating element secured to the bottom of the container by a support bar having its ends frictionally inserted into support slots on the container bottom and enclosed by a base cap separable from container itself so that access may be had to the heating means. Within the separable base cap is the power connection for the container and an indicating light to show a power-on condition. The bottom of the container has an indented annular lip which cooperates with the base cap to form a continuous watertight outside wall for the complete container. The bottom cap of the container is provided with a non-skid material to assist in maintaining the container in a stationary position within a moving vehicle.

1 Claim, 2 Drawing Sheets

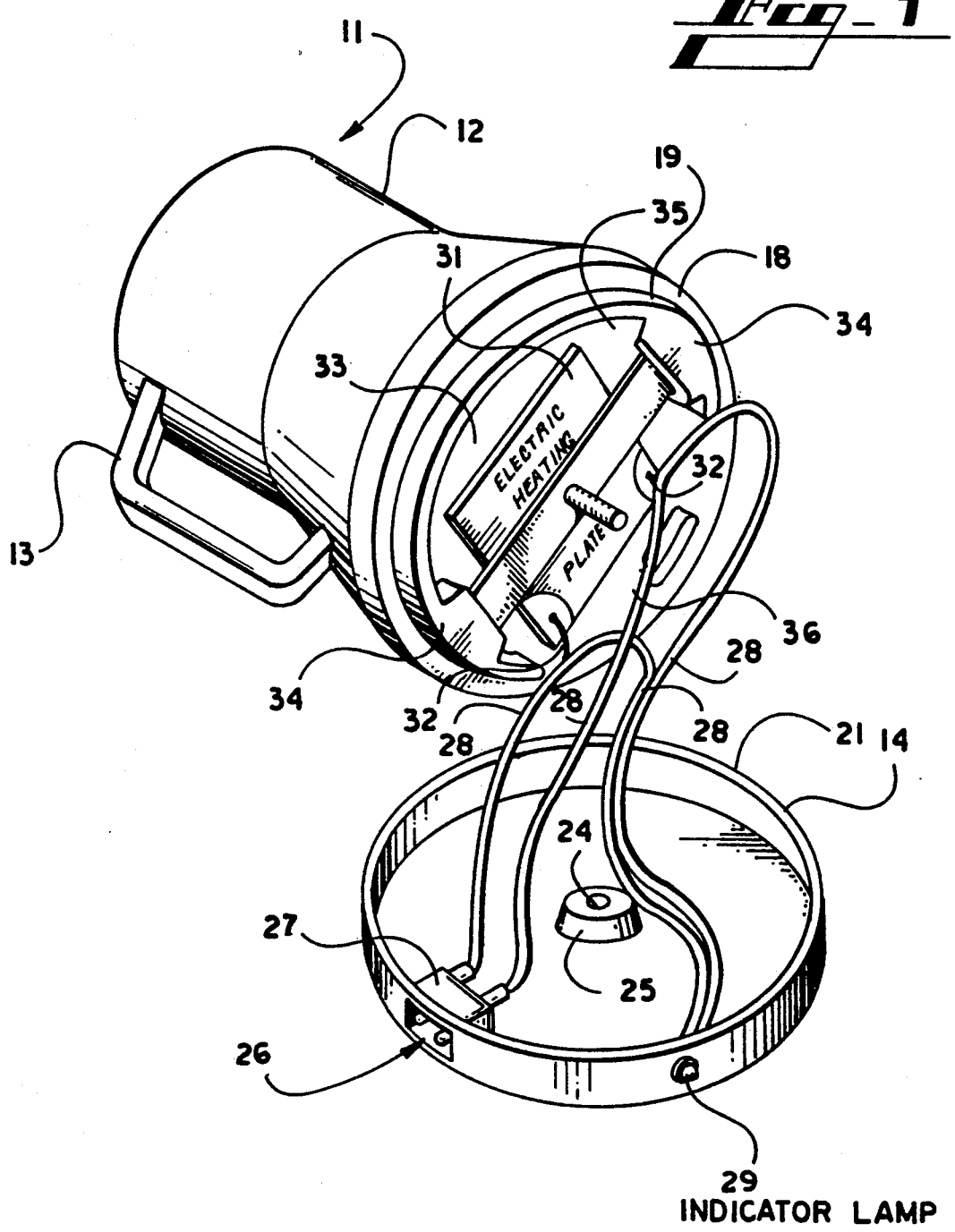
Fig_1

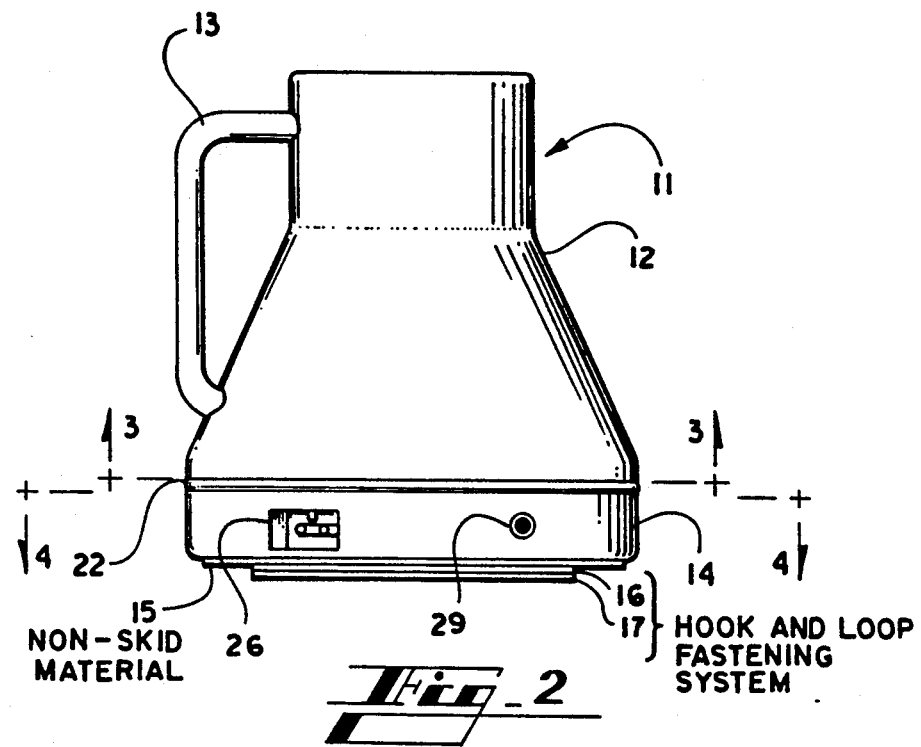
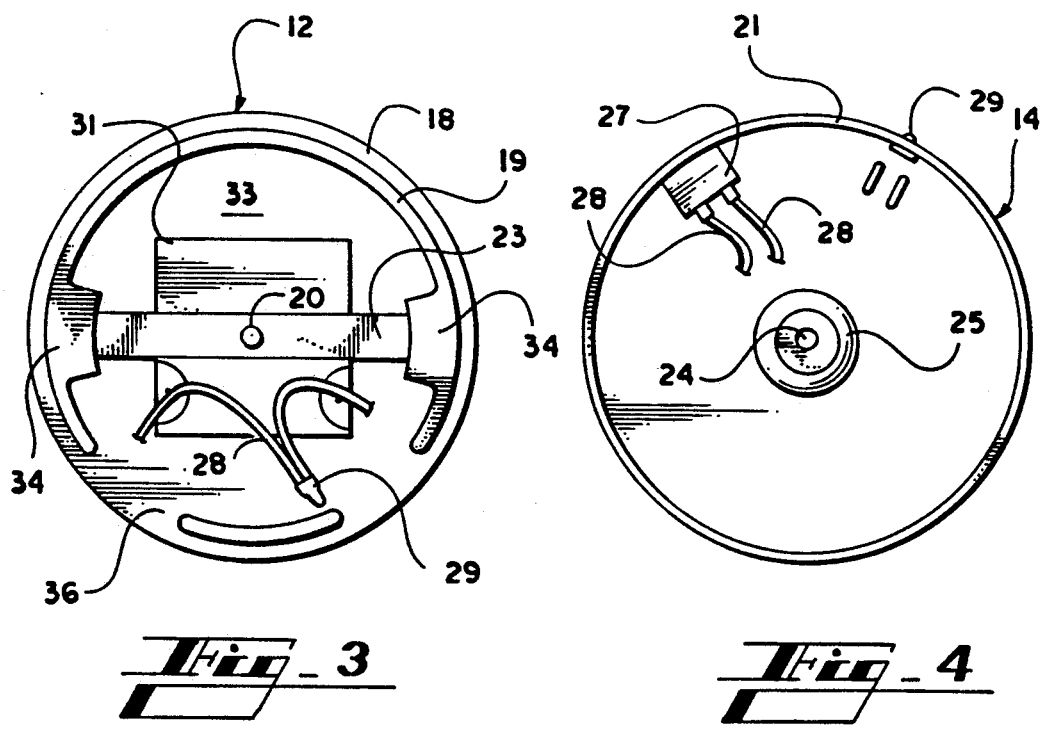

PORTABLE ELECTRICALLY HEATED CONTAINER FOR LIQUIDS

BACKGROUND OF THE INVENTION

I. Field of the Invention

The present invention relates generally to the field of containers for maintaining a liquid in a heated state within a container, and more particularly to a portable container having associated therewith an integral heating element in juxtaposition with the container wherein the heated element is supplied by a source of power to cause controlled heating of liquids within the container. The container contemplated herein will normally be used in a vehicle environment, or at the desk of a user.

II. Description of the Prior Art

The prior art is replete with containers which are heated with integral type heating devices for maintaining the contents of the container in a heated condition. Even though the prior art has attempted to solve those problems, the prior art fails in one or more aspects to make a market impact.

SUMMARY OF THE INVENTION

In accordance with the present invention, it is an object to overcome the disadvantages of the prior art and to provide a heated container having an integrally mounted heated element (preferably with a ceramic type container) which has a power connection adapted to supply power to the container from various types of power means.

It is, therefore, an object of the invention to provide a novel and unique electrically heated container for maintaining liquids therein in a heated condition, and for a container which is suitable for use in various environments.

Yet another object of the invention is a provision of an integrally heated vessel having a base cap on the bottom of the vessel which provides access to the heating element, and yet has means to restrain the vessel from movement when used in a moving vehicle.

The present invention also provides a heated container for maintaining liquids in a thermally heated state, which vessel is easily manufactured, is relatively inexpensive and which is readily adapted to a wide range of individual users.

The present invention provides for a container for maintaining a liquid in a heated state by means of electrical energy supplied to a heating element at the base of the container, and wherein the base of the container is separate from the container itself so that access may be had to the heating means. Within the separable base is the power connection for the container and an indicating light to show a power-on condition. The bottom of the container has an indented annular lip which cooperates with the base cap so that the base cap terminates at the indented portion of the container to form a continuous outside wall for the complete container. The bottom cap of the container is provided with a non-skid material to assist in maintaining the container in a stationary position within a moving vehicle.

Other objects, advantages and capabilities of the invention will become apparent from the following description taken in conjunction with the accompanying drawings, showing only a preferred embodiment of the invention.

BRIEF DESCRIPTION OF THE DRAWINGS

FIG. 1 is an exploded perspective view of the present invention showing the base cap removed from the bottom of the container;

FIG. 2 is an elevation view of the invention;

FIG. 3 is a view of the bottom of the container with the bottom cap removed; and FIG. 4 is a view of the top of the bottom cap with the bottom cap removed from the container.

DESCRIPTION OF THE PREFERRED EMBODIMENT

Referring to the drawings wherein like reference numerals designate corresponding parts throughout the several figures, the heated container is generally indicated by the numeral 11. The container comprises a cup 12 having a suitable shape and configuration, and being made of a material which is conducive to heating a liquid to be contained therein. For ease of utilizing the cup 12, a handle 13 is provided. In association with cup 12, and to provide an enclosure for the heating mechanism, the cup is provided with a base cap 14.

In typical use, it is anticipated that the cup will be carried by the user in a car or other type of vehicle which is constantly moving and shifting. Obviously, any type of liquid container would tend to slide and move around thereby spilling its contents. To eliminate the possibility of excessive movement of the cup, there is provided a non-skid base material 15 which is attached to the bottom surface of the base cap 14. Such a material might well be of rubberized construction and would prevent sliding of the cup at inopportune times. There may be times when it is desirable to maintain the cup upon the dashboard of a car, or the like, in a relatively fixed position where the possibilities of movement of the cup would be quite remote. To that end, it is anticipated that a hook and loop fastening system would be provided. Such a system is shown in FIG. 2 which shows a piece of hook material 16 and a piece of loop material attached to one another. The hook material 16 would be attached to the non-skid base material 15, while the loop material 17 would be attached to the dashboard or other mounting surface of the car. In this way the cup could be removed from the loop fastening portion for utilization and then reattached at any time the user desired.

The cup 12 comprises, at its lower distal end, a reentrant bottom cup lip 18 terminating in a downwardly projecting bottom rim 19. The bottom rim 19 is designed to cooperatively engage the base cap 14, and specifically to lie in juxtaposition with the top rim 21 of the base cap. As is more particularly shown in FIG. 1, the top annular rim 21 will fit over and around the bottom rim 19 of the cup and will lie in juxtaposition against the bottom cup lip 18. To provide a water tight seal, it is anticipated that a top annular rim 21 will be provided with a gasket 22 which will fit adjacent to the top rim 21 and, when the base cap 14 is in proper position, the gasket will fit tightly against the bottom cup lip 18. Gasket 22 is not shown in FIG. 1 in order not to clutter the drawing with elements which would obstruct the view of the other elements. However, gasket 22 is fully shown in its operative position in FIG. 2.

Securing the base cap 14 to the cup 12 will be a threaded mounting stud 20 which is connected to the element support bar 23, and will be adapted to project through the aperture 24 of the re-enforcement stud 25 of the base cap 14. The length of the mounting stud 20 will be sufficient to project through the reinforcement stud and exit at the bottom of the cup, at which time a suitable nut fastener (not shown) will be threaded upon the stud to maintain the base cap to the cup.

The power supply which causes the contents of the cup to be heated when it is in use will plug into the power input receptacle 26, which generally comprises a dual pronged receptacle of known design. The receptacle 26 is housed in the receptacle housing 27 which is anticipated to be a molded portion of the base cap 14. Power from the receptacle housing will then be supplied to the cup by means of the input power leads 28. The power leads 28 supply current to an indicating lamp 29 which glows when power is supplied to the cup 12, thereby indicating that it is in use. By means of the input power leads 28, power is also supplied to a heating element 31 by connecting power leads 32.

The heating element 31 is of a relatively thin and flat configuration which is placed against the bottom surface 33 of the cup so that when the heating element is energized heat is directly transferred to the cup, and subsequently to the contents of the cup The element 31 is maintained in place by means of the element support bar 23 resting directly against the element, and the support bar 23 is maintained in operative relationship with the cup by means of a pair of supports 34 which are molded into the bottom rim 19. Each support 34 is provided with a frictional engagement slot 35 into which an end of element support bar 23 is placed, thereby maintaining the heating element in its fixed position.

It should be noted that the bottom rim 19 has certain interrupted areas in its annular surface, as indicated by numeral 36, to provide mounting access for the receptacle housing 27 and the power leads to the indicating lamp 29. It is further anticipated that since the cup is designed to be a portable unit, the user may well want to use it either at a desk environment with 110 volt power supply or very probably in a moving vehicle where the power supply will be 12 volts. It should be obvious that the unit may be manufactured for any of the various commonly known power supplies, and such is contemplated herein. It is also anticipated that, in addition to the common electrical power supplies, a battery operation is quite feasible and instead of an outside source supplying power to the cup, one or more dry cell type batteries could be employed within the base cap 14 for supplying adequate power to heat the cup.

Various modifications may be made of the invention without departing from the scope thereof and it is desired, therefore, that only such limitations shall be placed thereon as are imposed by the prior art and which are set forth in the appended claims.

What is claimed is:

1. A container for maintaining a liquid beverage in a heated state by means of electrical energy supplied thereto comprising:

the container having an open proximal end and a closed distal end connected by a continuous side wall, the container side wall having a diameter at the distal end greater than the diameter of the proximal end to provide an enlarged capacity of the container at the distal end with respect to the proximal end, the distal end of the container having a bottom surface and a reentrant bottom cup lip, the bottom cup lip being defined by a downwardly depending bottom ring indented from the side wall of the container, a base cap positioned in juxtaposition to the distal end of the container, the base cap having a power input receptacle located in a wall thereof for receiving electrical energy, a heating element for maintaining the liquid in the container in a heated state, the heating element being electrically connected to the power input receptacle to receive electric power therefrom, the heating element further being placed adjacent to the bottom surface of the container for imparting heat directly to the bottom surface thereof, a visual indicating means electrically connected to the power input receptacle for indicating a power-on condition, the indicating means being located in the base cap and observable from the exterior thereof, the base cap being configured to fit about the bottom rim and positioned to overlie and contact the cup lip, the base cap having a proximal end and a distal end, the proximal end of the base cap being defined by an annular rim, gasket means positioned on the annular rim between the lip and the bottom cup lip, the proximal end of the base cap being placed in juxtaposition with the distal end of the container and adjacent to the cup lip, heating element support means positioned adjacent to the heating element for maintaining the heating element in juxtaposition to the bottom surface of the container, the bottom rim being provided with interrupted areas therethrough to provide mounting access for the power input receptacle and wiring for the visual indicating means therein, the bottom rim further having an inwardly facing wall, said wall being provided with a pair of diametrically spaced apart support members, each support member being provided with frictional engagement slot means for receiving the heating element mounting means, the element support means being received in frictional engagement with the bottom rim slot means to maintain the heating element adjacent to the bottom surface of the container, the bottom rim integrally formed with the bottom cup lip, the bottom cup lip terminating at the juncture of the bottom rim with the bottom surface of the container, cooperating means on said container and base cap for maintaining the base cap in juxtaposition with said container with said gasket interposed between the annular rim of the base cap and the cup lip of the container, and means affixed to the distal end of the base cap to provide a non-slip surface thereon.

* * * * *